`(12)` United States Patent
Tan

(10) Patent No.: US 8,213,197 B1
(45) Date of Patent: Jul. 3, 2012

(54) SWITCHING CAPACITOR POWER SUPPLY

(75) Inventor: Kee Hian Tan, Singapore (SG)

(73) Assignee: Marvell International Ltd., Hamilton (BM)

( * ) Notice: Subject to any disclaimer, the term of this patent is extended or adjusted under 35 U.S.C. 154(b) by 1053 days.

(21) Appl. No.: 11/848,795

(22) Filed: Aug. 31, 2007

Related U.S. Application Data

(60) Provisional application No. 60/824,534, filed on Sep. 5, 2006.

(51) Int. Cl.
*H02M 3/06* (2006.01)

(52) U.S. Cl. ........................................ 363/62

(58) Field of Classification Search .......... 323/282, 323/293, 294; 363/59, 60, 62; 307/108, 307/110; 327/535, 536
See application file for complete search history.

(56) References Cited

U.S. PATENT DOCUMENTS

| | | | | |
|---|---|---|---|---|
| 4,799,042 A * | 1/1989 | Confalonieri et al. | ........ | 341/118 |
| 5,034,623 A * | 7/1991 | McAdams | ........................ | 327/74 |
| 5,561,634 A * | 10/1996 | Yang | ........................ | 365/189.05 |
| 5,608,614 A * | 3/1997 | Ohnishi et al. | ................... | 363/60 |
| 5,610,807 A * | 3/1997 | Kanda et al. | .................... | 363/43 |
| 5,635,776 A * | 6/1997 | Imi | ............................... | 307/110 |
| 5,903,234 A * | 5/1999 | Kimura | ......................... | 341/144 |
| 5,959,439 A * | 9/1999 | Shenai et al. | ................. | 323/222 |
| 6,169,673 B1 * | 1/2001 | McIntyre et al. | ............... | 363/59 |
| 6,236,239 B1 * | 5/2001 | Kogushi | ......................... | 326/88 |
| 6,281,826 B1 * | 8/2001 | Kimura | ......................... | 341/150 |
| 6,385,124 B2 * | 5/2002 | Ooishi | ..................... | 365/230.06 |
| 6,549,437 B1 * | 4/2003 | Takeuchi et al. | ................ | 363/59 |
| 6,597,199 B1 * | 7/2003 | Bui | ................................ | 326/83 |
| 6,784,701 B2 * | 8/2004 | Kuge | ............................ | 327/108 |
| 6,919,717 B2 * | 7/2005 | Ghassemi | ..................... | 324/126 |
| 7,019,992 B1 * | 3/2006 | Weber | ............................ | 363/63 |
| 7,099,167 B2 * | 8/2006 | Fujise | ............................ | 363/62 |
| 7,190,210 B2 * | 3/2007 | Azrai et al. | ................... | 327/536 |
| 7,746,041 B2 * | 6/2010 | Xu et al. | ........................ | 323/223 |
| 7,777,459 B2 * | 8/2010 | Williams | ...................... | 323/266 |
| 2006/0077002 A1 * | 4/2006 | White | ............................ | 327/544 |

\* cited by examiner

*Primary Examiner* — Adolf Berhane
*Assistant Examiner* — Yemane Mehari

(57) ABSTRACT

Methods and systems related to capacitive voltage converters are disclosed. Such voltage converters may use a plurality of capacitors each having a first terminal and a second terminal. By periodically switching each first terminal between an input/supply voltage line and an output voltage line while also periodically switching each second terminal between the output voltage line and a reference voltage line, an output voltage having little ripple may be efficiently produced.

37 Claims, 14 Drawing Sheets

SWITCHING CAPACITOR POWER SUPPLY

INCORPORATION BY REFERENCE

This application claims priority under 35 U.S.C. §119(e) from U.S. Provisional Application Ser. No. 60/824,534 filed on Sep. 5, 2006 herein incorporated by reference in its entirety.

BACKGROUND

Switching capacitor power supplies are incorporated into a vast number of devices used in everyday life, especially devices that require multiple voltage power sources. For example, switching capacitor power supplies are used in a variety of telephony switching devices, cellular telephones, magnetic hard disk drives, fiber optic communication systems and even children's toys. Additionally, such switching capacitor power supplies are often used for systems where a special voltage is needed for only a small portion of a large circuit. For example, many sophisticated processing devices require a main power source for most functions, but also require a lower voltage power source to supply some of the processor's internal memory.

Unfortunately, switching capacitor power supplies often suffer from a number of performance shortfalls, such as relatively poor efficiency and excessive ripple in their outputs. These problems can, in turn, lead to diminished performance of practically any system incorporating the switching power supplies. For example, portable devices may have a shortened battery life, logic states may be inadvertently corrupted and communications devices may have diminished sensitivity.

SUMMARY

In various embodiments, methods and systems related to capacitive voltage converters are disclosed. Such voltage converters, having a supply voltage line, an output voltage line and a reference voltage line, may use a plurality of capacitors each having a first terminal and a second terminal. By periodically switching each first terminal between the supply voltage line and the output voltage line while also periodically switching each second terminal between the output voltage line and the reference voltage line, an output voltage having little ripple may be efficiently produced.

DETAILED DESCRIPTION OF EMBODIMENTS

In the following descriptions, many of the exemplary circuits are shown to include n-channel and p-channel field-effect transistors (FETs) in a variety of configurations. While generic FET devices are used by example, the disclosed circuits may be implemented using any number of FET and other transistor types, such as MOSFETs, J-FETs, IGBTs, bipolar transistors and so on.

Further, while the terms "drain" and "source" are used for ease of explanation and to adhere to traditional engineering usage, it should be recognized that a drain and source of a FET transistor may be considered interchangeable, and thr the following descriptions merely thought of as a first end and a second end of a semiconductor channel unless otherwise stated or apparent to one of ordinary skill in the art.

Figure 1:
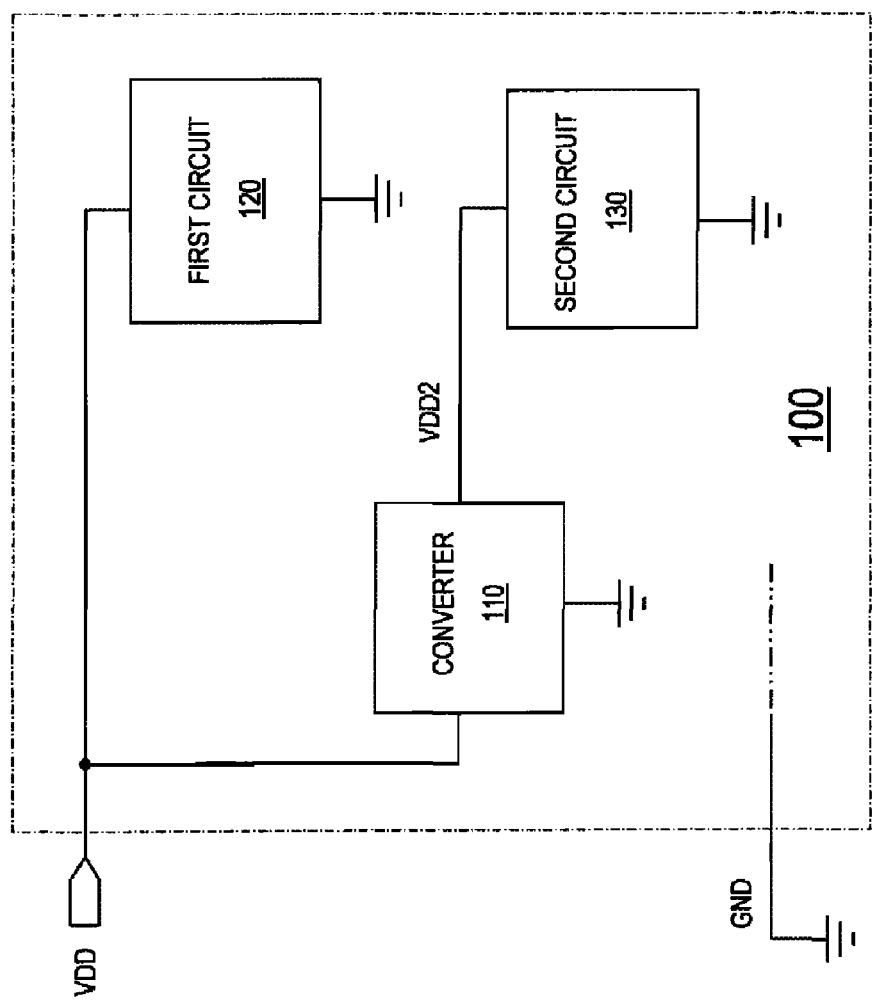
FIG. 1 is a block diagram of an exemplary circuit incorporating a switching capacitor voltage converter.

FIG. 1 is a block diagram of an exemplary electronic system 100. As shown in FIG. 1, system 100 includes a voltage converter 110, a first circuit 120 and a second circuit 130. For the present example, it should be appreciated that first circuit 120 and second circuit 130 may require separate power voltage levels and/or that second circuit 130 may require an additional voltage that first circuit 120 does not.

In operation, an input supply voltage VDD may be supplied to system 100 to be routed to both converter 110 and first circuit 120. First circuit 120 may operate using input supply voltage VDD while converter 110 may use input supply voltage VDD to produce an output voltage VDD2, which may be provided to second circuit 130.

Note that system 100 may be incorporated into any number of portable and non-portable devices, such as personal digital assistants (PDA), wireless phones, liquid crystal displays (LCD), processors having special power requirements, and so on.

Figure 2:
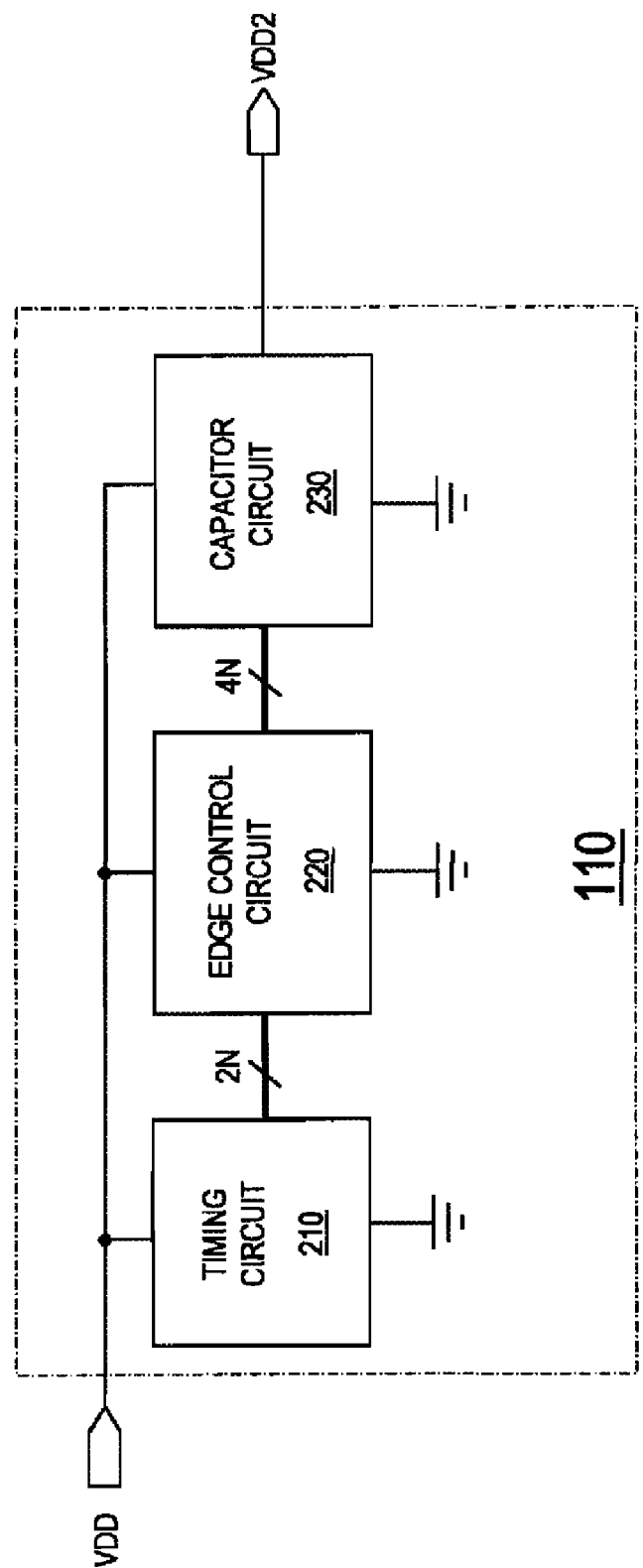
FIG. 2 is a block diagram of the voltage converter of FIG. 1.

FIG. 2 is a block diagram of the voltage converter 110 of FIG. 1. As shown in FIG. 2, converter 110 may be conceptually divided into three functional circuits including a timing circuit 210, an edge control circuit 220 and a capacitor circuit 230. Note that exemplary voltage converter 110 may be classified as what is sometimes called in the relevant arts as a "switching capacitive power supply," and for the present embodiment may also be classified as what is sometimes called a "step-down" voltage converter/power supply.

In operation and under power of supply voltage VDD, timing circuit 210 may cyclically generate N pairs of substantially identical output waveforms/timing signals that may be temporally spaced from one another at regular intervals. For example, assuming that the output waveforms/timing signals repeat every millisecond and there are five (N=5) distinct pairs of square-wave timing signals, then each pair of square-wave timing signals may be separated by intervals of $2\pi/5$ (200 microseconds).

Edge control circuit 220 may receive the 2N timing signals, manipulate the timing signals and produce 4N distinct output waveforms that may be specially shaped, i.e., may have rising and falling edges that vary relative to one another. The 4N shaped output waveforms may then be provided to capacitor circuit 230, where they may be used to cause individual capacitors to sequentially switch according to a "break before make" fashion, which, as will be explained below, may lead to increased efficiency while avoiding possible intermittent shorting between input voltage line VDD and output voltage line VDD2, as well as between output voltage line VDD2 and a reference voltage line, e.g., signal or power ground.

Figure 3:
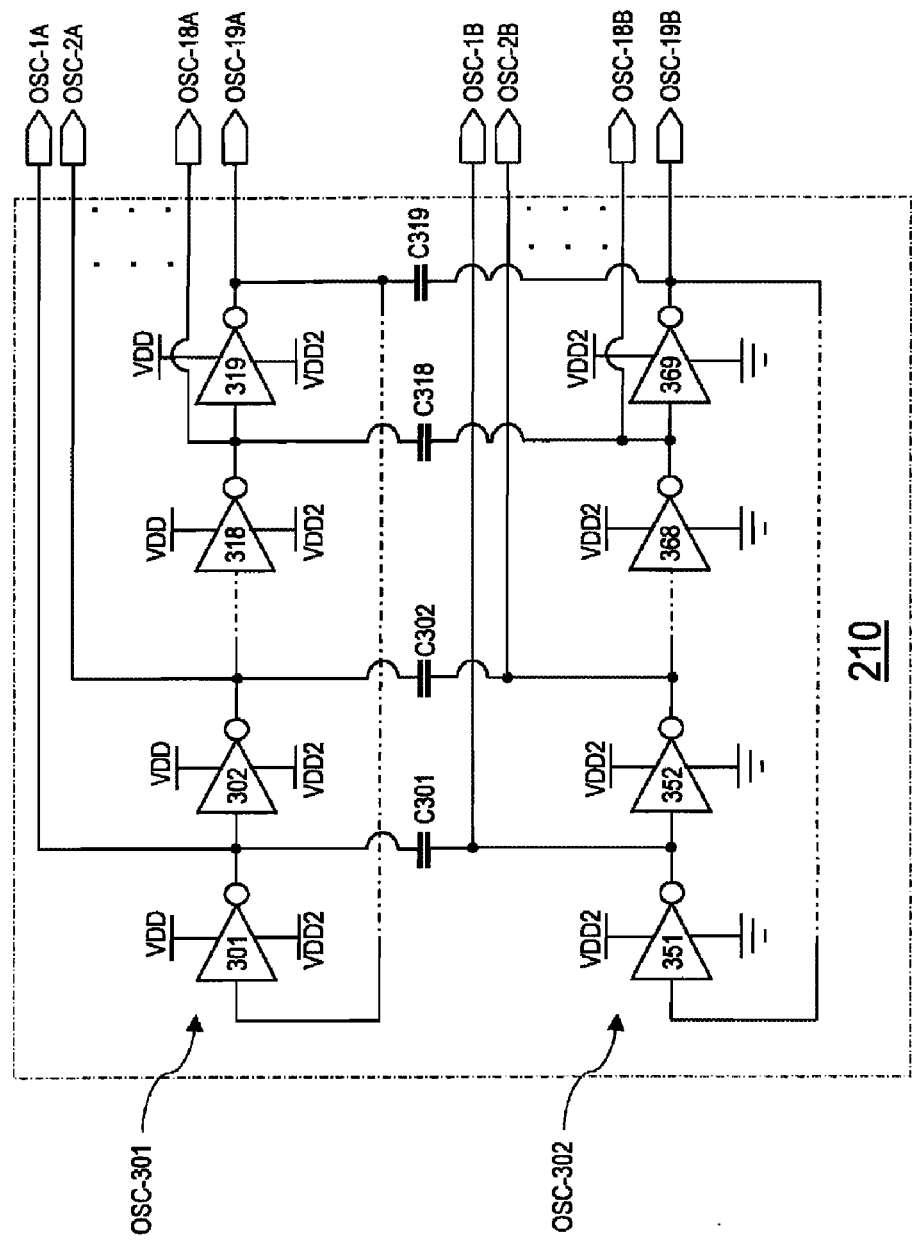
FIG. 3 is a schematic representation of the timing circuit of FIG. 2.

FIG. 3 is a schematic representation of timing circuit 210. As shown in FIG. 3, timing circuit 210 may be conceptually divided into two separate ring oscillators OSC-301 and OSC-302. Ring oscillator OSC-301 includes nineteen (19) separate inverters 301-319 each powered using input supply voltage VDD and output voltage VDD2. Ring oscillator OSC-302 also includes nineteen (19) separate inverters 351-369 each powered using output voltage VDD2 and reference/ground. A series of capacitors C301-C319 is used to couple respective pairs of inverter outputs such that ring oscillator OSC-301 and ring oscillator OSC-302 may synchronize. Accordingly, it should be appreciated that the rising and falling edges of each output signal OSC-1A . . . OSC-19A of ring oscillator OSC-301 may rise and fall at substantially the same times as their counterpart output signals OSC-1B . . . OSC-19B of ring oscillator OSC-302.

While the various output signals OSC-1A . . . OSC-19A and OSC-1B . . . OSC-19B may be synchronized, the voltage range of the two groups may differ due to their respective power and return voltages. For example, assuming VDD=3.0V and VDD2=1.5V (relative to ground), output signals OSC-1A . . . OSC-19A may each vary from about 1.5V to about 3.0V while output signals OSC-1B . . . OSC-19B may each vary from about 0.0V to about 1.5V.

While each exemplary ring oscillator OSC-301 and OSC-302 of FIG. 3 uses nineteen inverters, it should be appreciated that any odd number (i.e., 2n+1 where n is an integer) of inverters may be used as may be found necessary or advantageous.

Further, while the exemplary embodiment of FIG. 3 uses a dual ring oscillator structure as its base design, in various other embodiments output signals OSC-1A . . . OSC-19A and OSC-1B . . . OSC-19B may be generated using a single ring oscillator while employing some form of subsequent level shifting buffers. Additionally, in still other embodiments, a ring oscillator structure may be replaced by some form of other oscillator with combinatorial logic to produce the various separate timing signals. That is, while exemplary timing circuit 210 is a useful embodiment, it is but one of may useful circuit designs that may be used to generate the desired output signals OSC-1A . . . OSC-19A and OSC-1B . . . OSC-19B.

Figure 4:
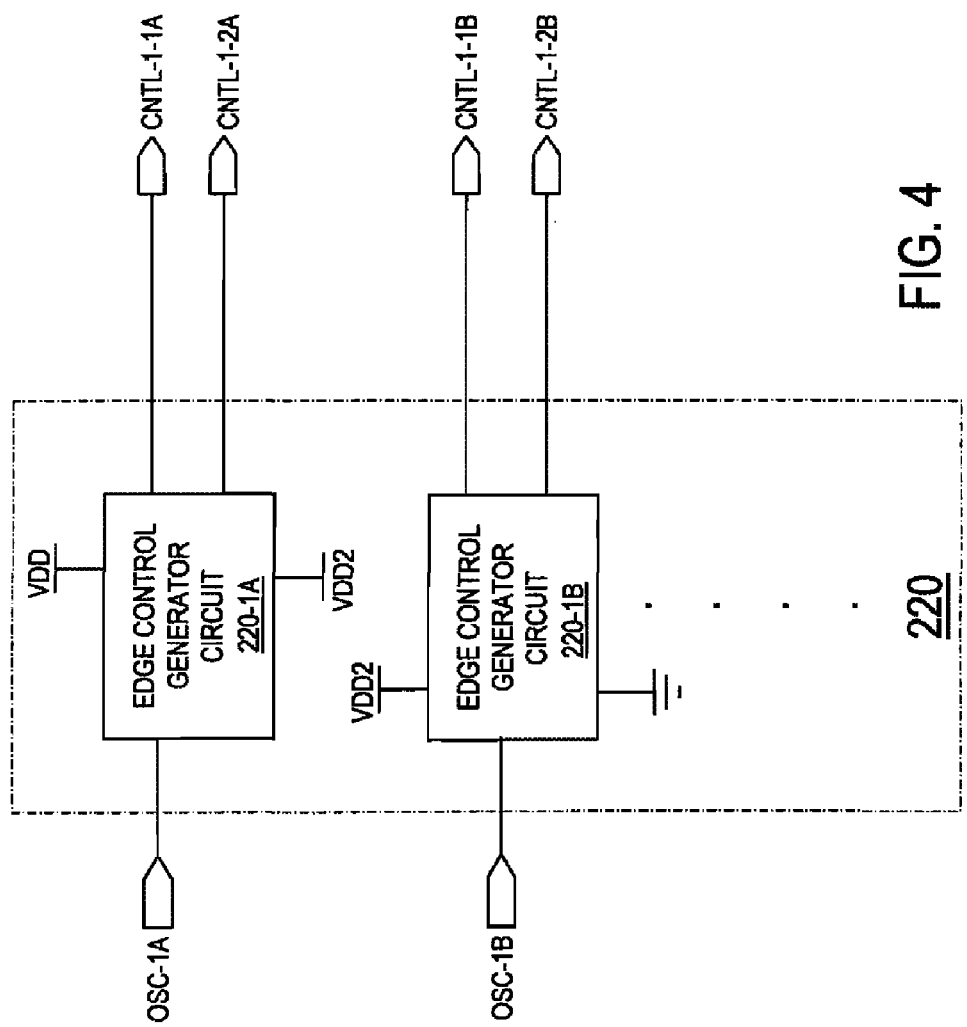
FIG. 4 is a block diagram of the edge control circuit of FIG. 2.

FIG. 4 is a block diagram of edge control circuit 220 shown in FIG. 2. As shown in FIG. 4, edge control circuit 220 can include a respective pair of edge control generator circuits 220-1A and 220-1B corresponding to respective timing circuit signals OSC-1A and OSC-1B. While edge control circuit 220 may include another eighteen pair of edge control circuits for signals OSC-2A . . . OSC-19A and OSC-2B . . . OSC-19B, their presence is omitted from FIG. 4 for sake of clarity noting that in various embodiments the remaining eighteen pairs of circuits may resemble or be identical to edge control generator circuits 220-1A and 220-1B.

Figure 5:
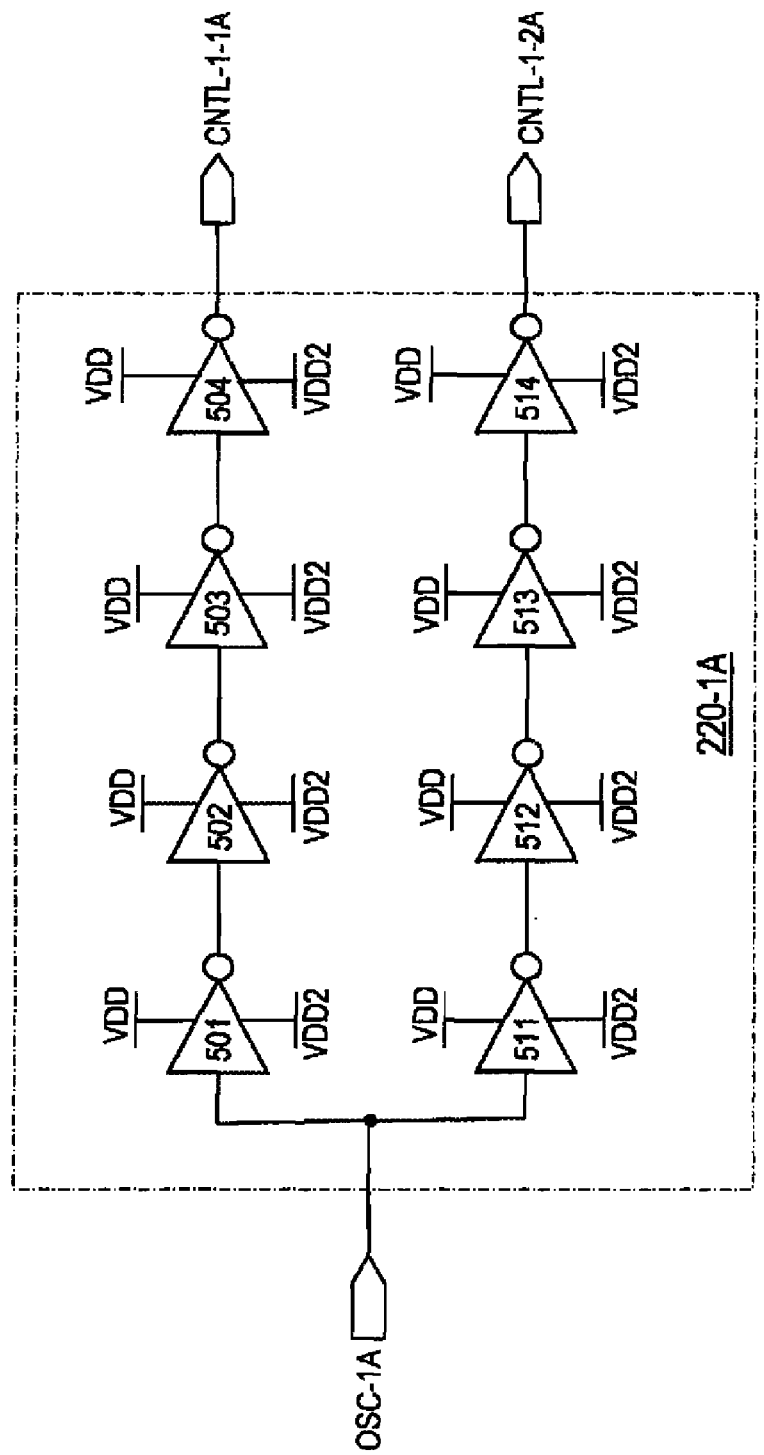
FIG. 5 is a schematic diagram of an edge control generator circuit of FIG. 4.

Continuing to FIG. 5, a schematic diagram of edge control generator circuit 220-1A is provided. As shown in FIG. 5, edge control generator circuit 220-1A includes a first set of buffers 501 . . . 504 arranged in series, and a second set of buffers 511 . . . 514 also arranged in series. Buffers 501 . . . 504 and 511 . . . 514 can, for example, be inverters.

While the present embodiment includes two sets of four buffers, it should be appreciated that the exact number of buffers may vary. It should further be appreciated that while the exemplary edge control generator circuit 220-1A may be used for the "upper" timing circuit output signals OSC-1A . . . OSC-19A to produce shaped output signals that range somewhere between VDD and VDD2, the same circuit approach may be used to for the "lower" timing circuit output signals OSC-1B . . . OSC-19B to produce shaped output signals that range somewhere between VDD2 and ground.

While not specifically shown in FIG. 5, each of the first set of buffers 501 . . . 504 may include n-channel FETs and p-channel FETs having substantially different sizes, which may affect the relative delay of rising and falling edges for shaped output signal CNTL-1-1A. An n-channel FET with a short channel width can take a longer time to discharge an output node of a buffer than an n-channel FET with a long channel width, thus, resulting in a delayed falling edge; and a p-channel FET with a short channel width can take a longer time to charge an output node of a buffer than a p-channel FET with a long channel width, thus, resulting in a delayed rising edge. Likewise, an n-channel FET with a long channel width can take less time to discharge an output node of a buffer than an n-channel FET with a short channel width, thus, resulting in a fast falling edge; and a p-channel FET with a long channel width can take less time to charge an output node of a buffer than a p-channel FET with a short channel width, thus, resulting in a fast rising edge. For example, by using substantially smaller n-channel FETs compared to p-channel FETs, CNTL-1-1A may have a rising edge that rises at about the same time as the rising edge of OSC-1A (i.e., there is but a small delay) while the falling edge of CNTL-1-1A may have a falling edge that transitions only after an appreciable time lag (i.e., there is a large delay).

Similarly, each of the second set of buffers 511 . . . 514 may also include n-channel FETs and p-channel FETs having substantially different sizes, which may affect the relative delay of rising and falling edges for shaped output signal CNTL-1-2A. For example, by using substantially smaller p-channel FETs compared to n-channel FETs, CNTL-1-2A may have a falling edge that falls at about the same time as the falling edge of OSC-1A (i.e., there is but a small delay) while the rising edge of CNTL-1-2A transitions only after an appreciable time lag.

Figure 6:
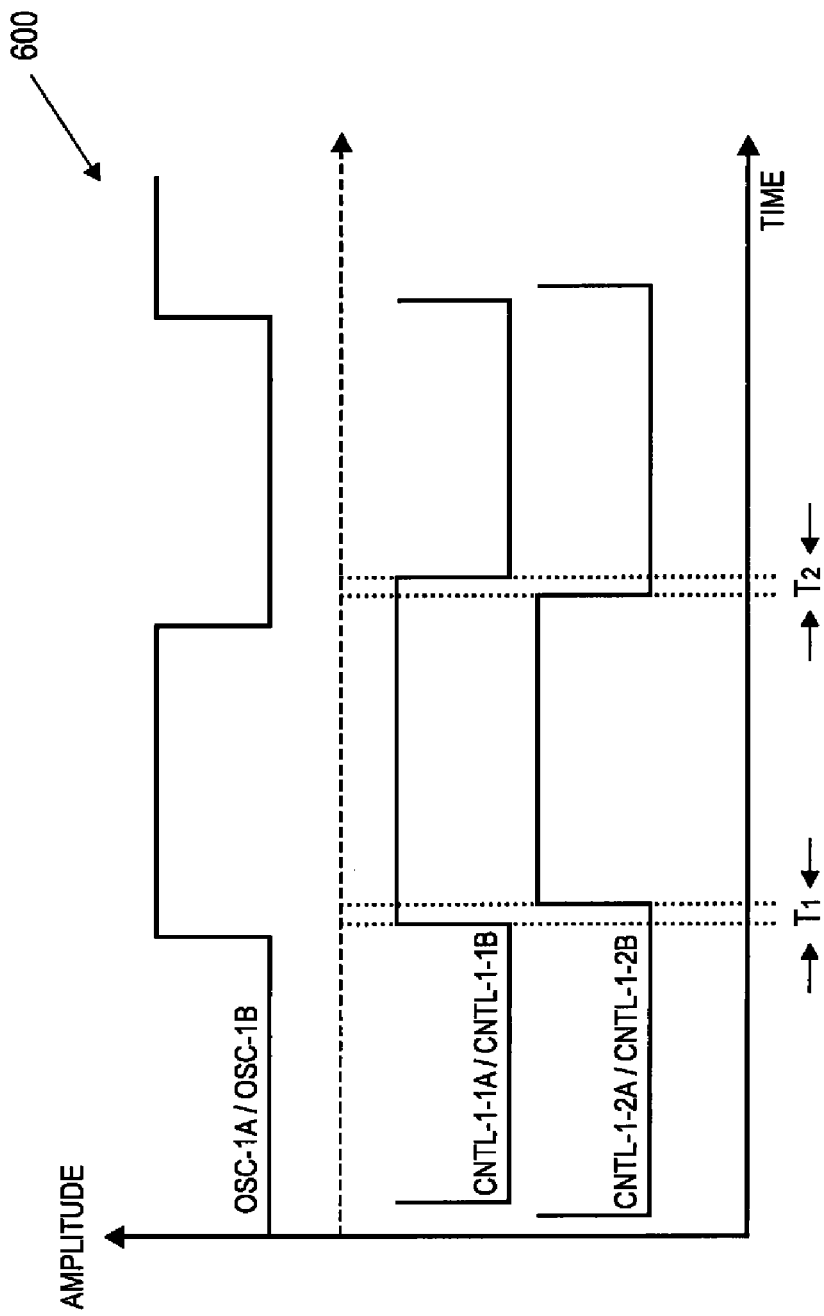
FIG. 6 is a timing diagram depicting the functionality of the edge control generator circuits of FIG. 4

FIG. 6 is a timing diagram 600 depicting the functionality of edge control generator circuits 220-1A and 220-1B. As shown in FIG. 6, the upper portion of timing diagram 600 includes a waveform representation of output signals OSC-1A and OSC-1B (ignoring for the moment their different voltage ranges). The lower portion of timing diagram 600 depicts the relative time lag ($T_1$) of the rising edges of signals CNTL-1-2A and CNTL-1-2B, as well as the relative time lag ($T_2$) of the falling edges of signals CNTL-1-1A and CNTL-1-1B. Again as mentioned above, the shaped outputs, i.e., the delayed rising and falling edges, may be used to control capacitor circuit 230 to improve efficient and avoid intermittent shorting.

Figure 7:
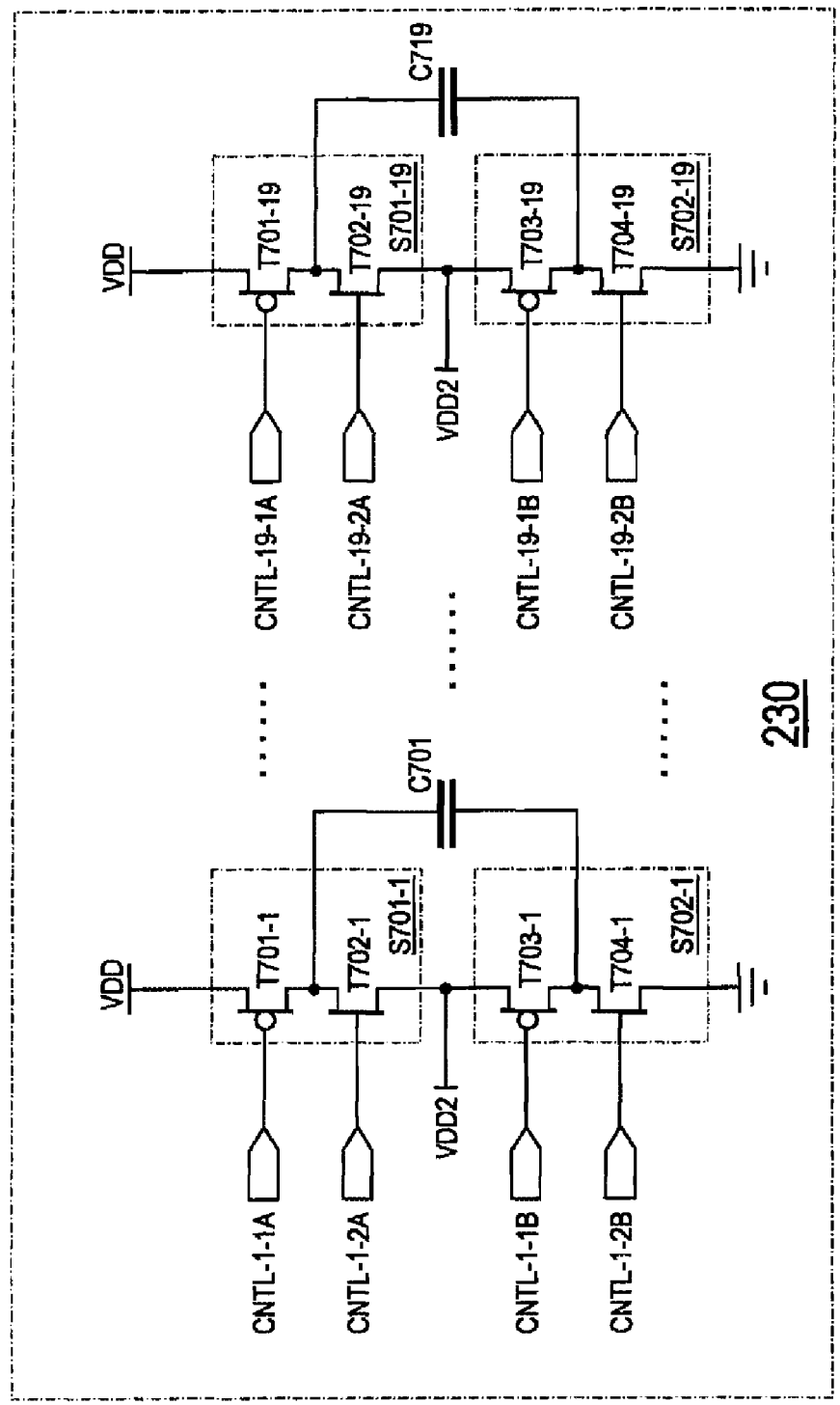
FIG. 7 is a schematic representation of the capacitor circuit of FIG. 2.
Figure 8:
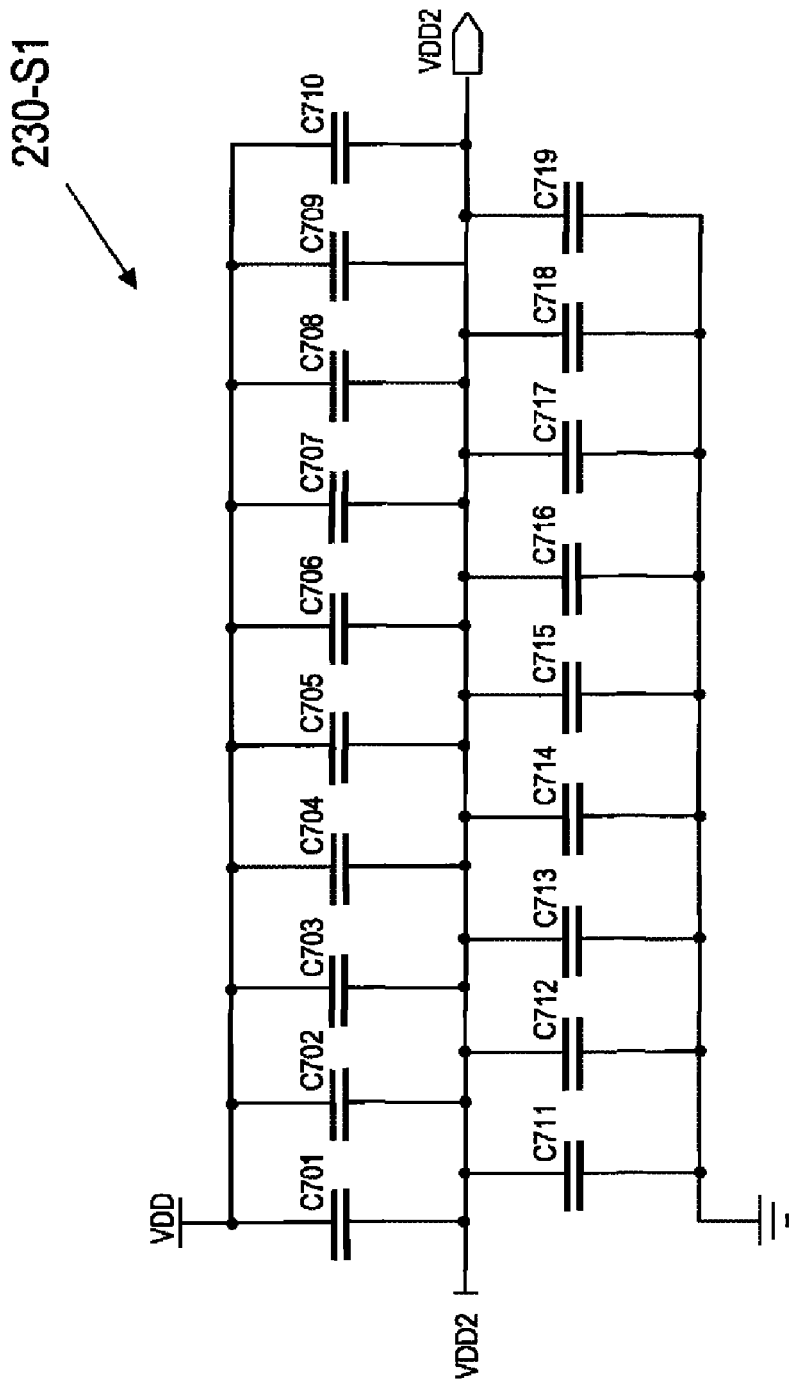
FIGS. 8-12 depict a succession of capacitor states for the capacitor circuit of FIG. 2.

FIG. 7 is a schematic representation of capacitor circuit 230. As shown in FIG. 7, capacitor circuit 230 includes nineteen capacitors C701 . . . C719 with each capacitor C701 . . . C719 having an upper and lower terminal. Each upper terminal may be connected to a respective first switching circuit S701-1 . . . S701-19, and each lower terminal may be connected to a respective second switching circuit S702-1 . . . S702-19. Each first switching circuit S701-1 . . . S701-19 includes a complementary pair of p-channel and n-channel FETs T701-1/T702-1 . . . T701-19/T702-19. Similarly, each second switching circuit S702-1 . . . S702-19 also includes a complementary pair of p-channel and n-channel FETs T703-1/T704-1 . . . T703-19/T704-19.

In operation, each upper terminal of capacitor C701 to C719 may be effectively switched between lines VDD and VDD2 while each lower terminal may be simultaneously (or approximately so) switched between lines VDD2 and ground/ reference according to the general timing of output signals OSC-1A . . . OSC-19B of timing circuit 210.

Due to the shaped nature of the control signals CNTL-1-1A, CNTL-1-1B, CNTL-1-2A and CNTL-1-2B (i.e. their differentially delayed rising and falling edges) provided by edge control circuit 220, each complementary pair of FETs, e.g., T701-1 and T702-1, may break contact with one line before making contact with another. For example, because signal CNTL-1-1A rises before signal CNTL-1-1B, p-channel FET T701-1 may turn off (i.e., effectively isolating the upper terminal of capacitor C701 from VDD) well before n-channel FET T702-1 turns on (i.e., effectively coupling the upper terminal of capacitor C701 with VDD2). Similarly, because signal CNTL-1-2B falls before signal CNTL-1-1B, n-channel FET T704-1 may turn off (i.e., effectively isolating the lower terminal of capacitor C701 from ground) well before p-channel FET T703-1 turns on (i.e., effectively coupling the lower terminal of capacitor C701 with VDD2). This "break before make" approach may assure that lines VDD and VDD2 are not intermittently shorted, as well as assures that lines VDD2 and ground/reference are not intermittently shorted.

Figure 9:
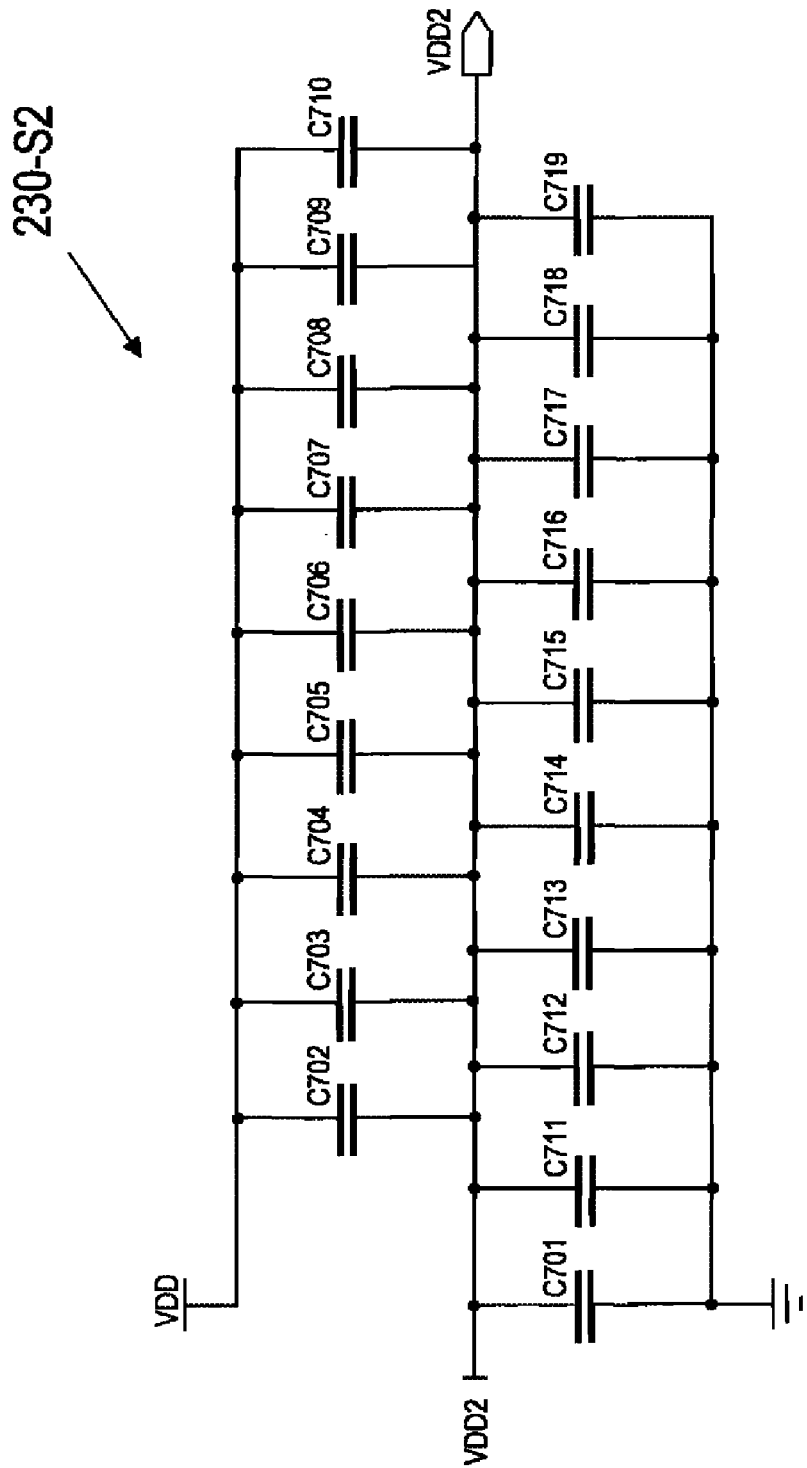
Figure 10:
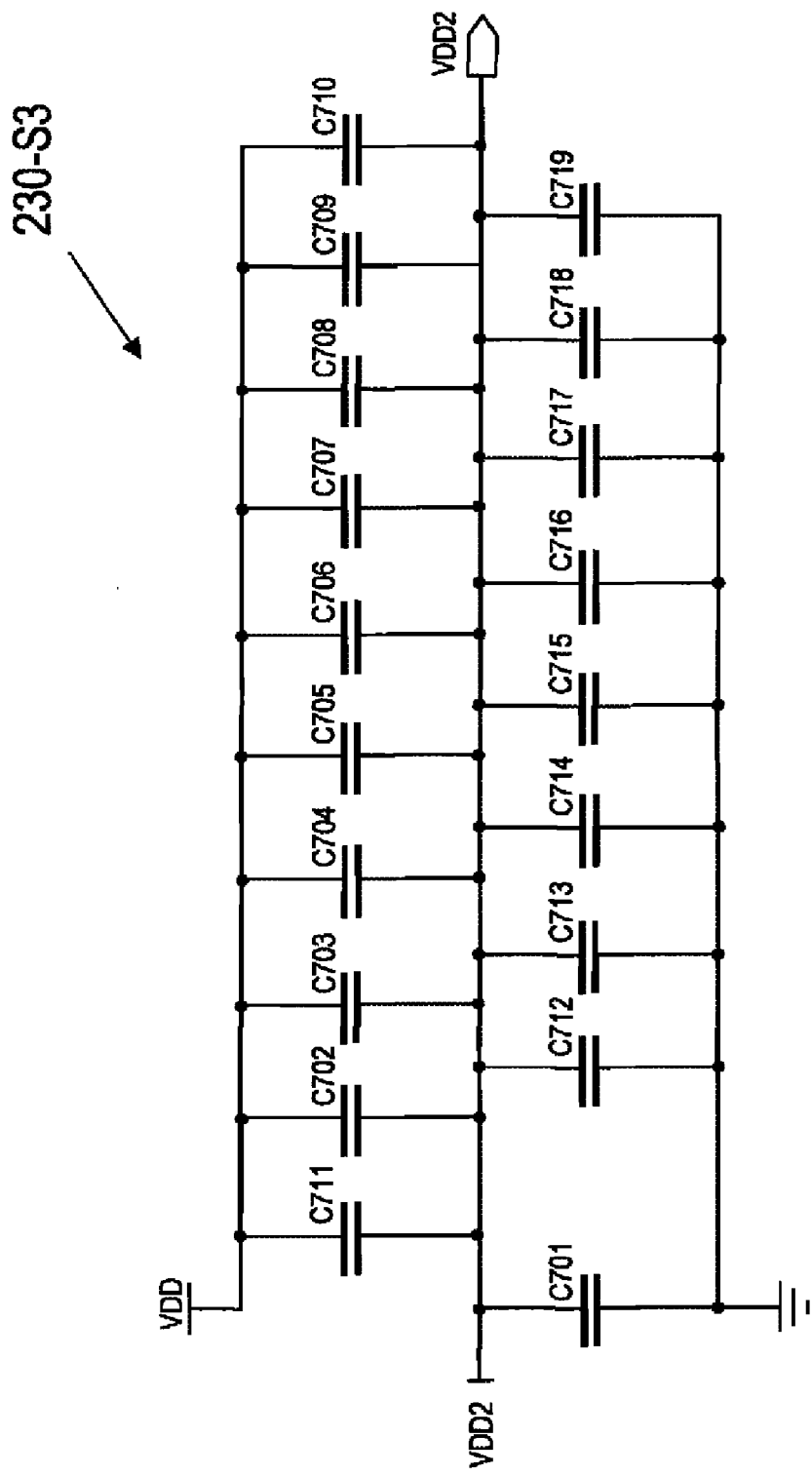
Figure 11:
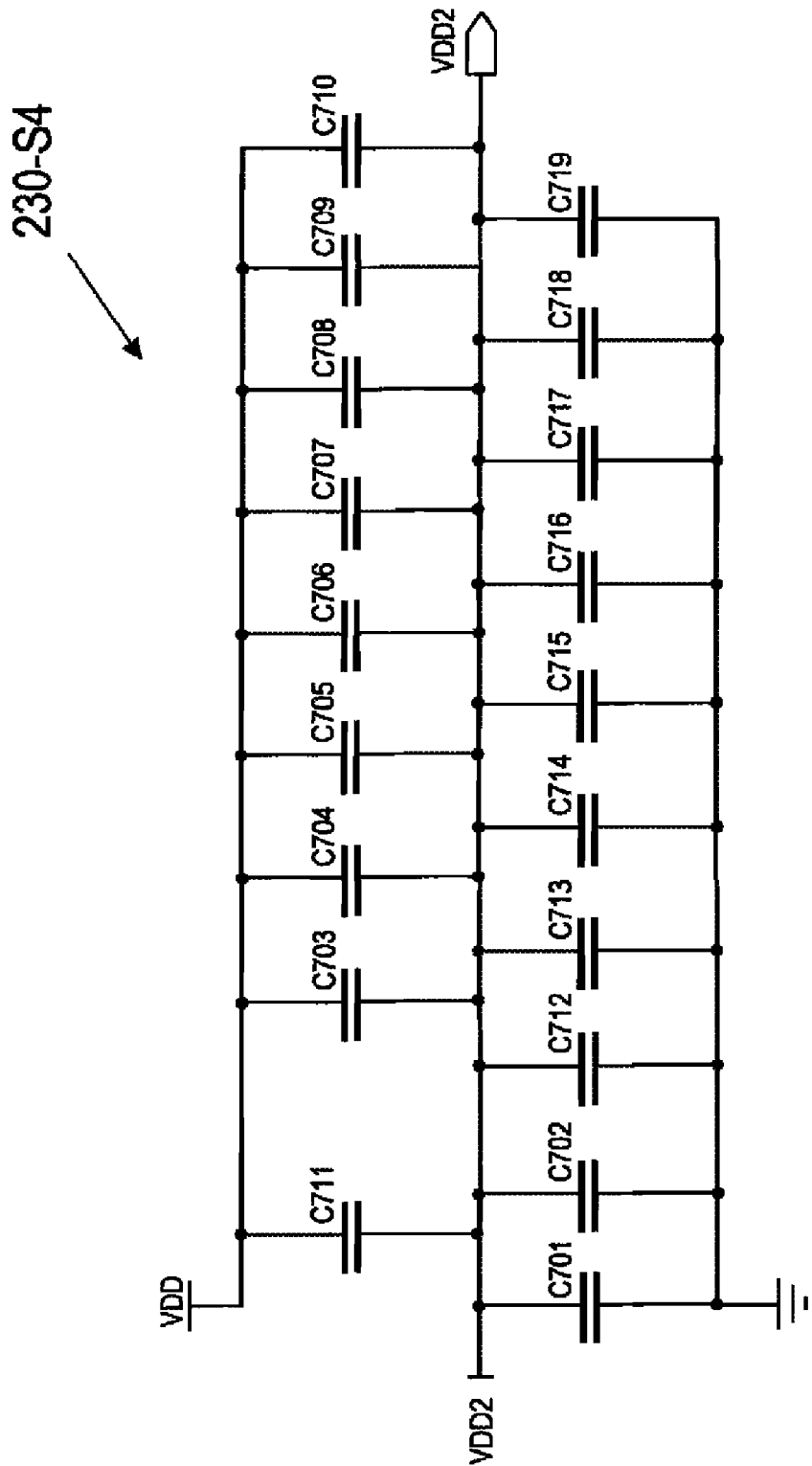
Figure 12:
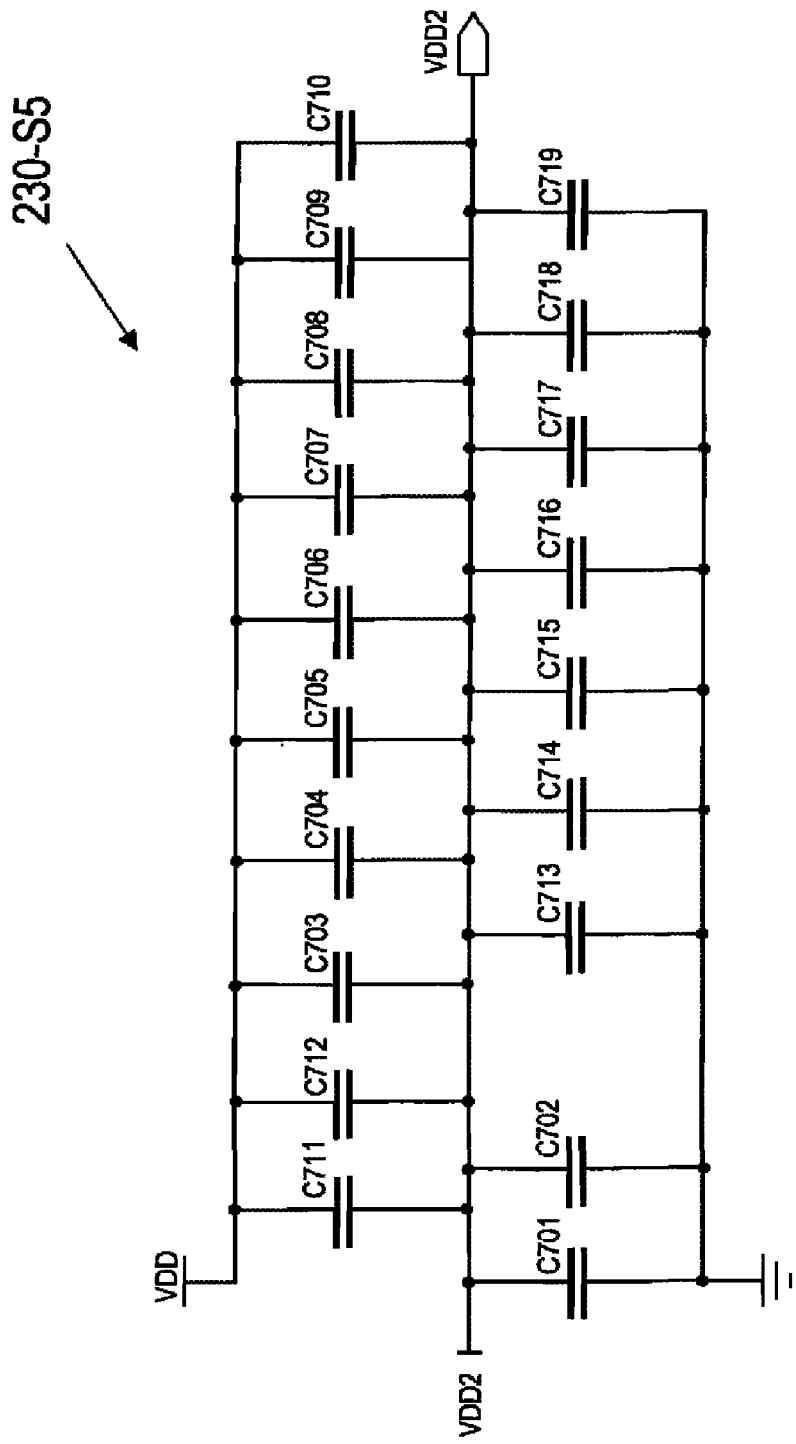

FIGS. 8-12 depict a succession of capacitor states for capacitor circuit 230. As shown first in FIG. 8 (state 230-S1), presumable under the general control of timing circuit 210, capacitors C701 to C710 are coupled between supply voltage line VDD and output voltage line VDD2, while capacitors C711 to C719 are coupled between output voltage line VDD2 and ground. Next, as shown in FIG. 9, as the output state of timing circuit 210 progresses, the configuration of capacitors C701 to C719 may progress to state 230-S2, where capacitor C701 switches from coupling supply voltage line VDD and output voltage line VDD2 to coupling output voltage line VDD2 and ground carrying with it the energy stored within. Continuing to FIG. 10 (state 230-S3), capacitor C711 is shown to switch from coupling output voltage line VDD2 and ground to coupling supply voltage line VDD and output voltage line VDD2. Similarly, in FIGS. 11 and 12 (states 230-S4 and 230-S5), capacitors C702 and C712 are shown to undergo similar changes, and as may be expected, the configuration of capacitor circuit 230 may revert to state 230-S1 as the next cycle of timing circuit 210 begins again.

Figure 13:
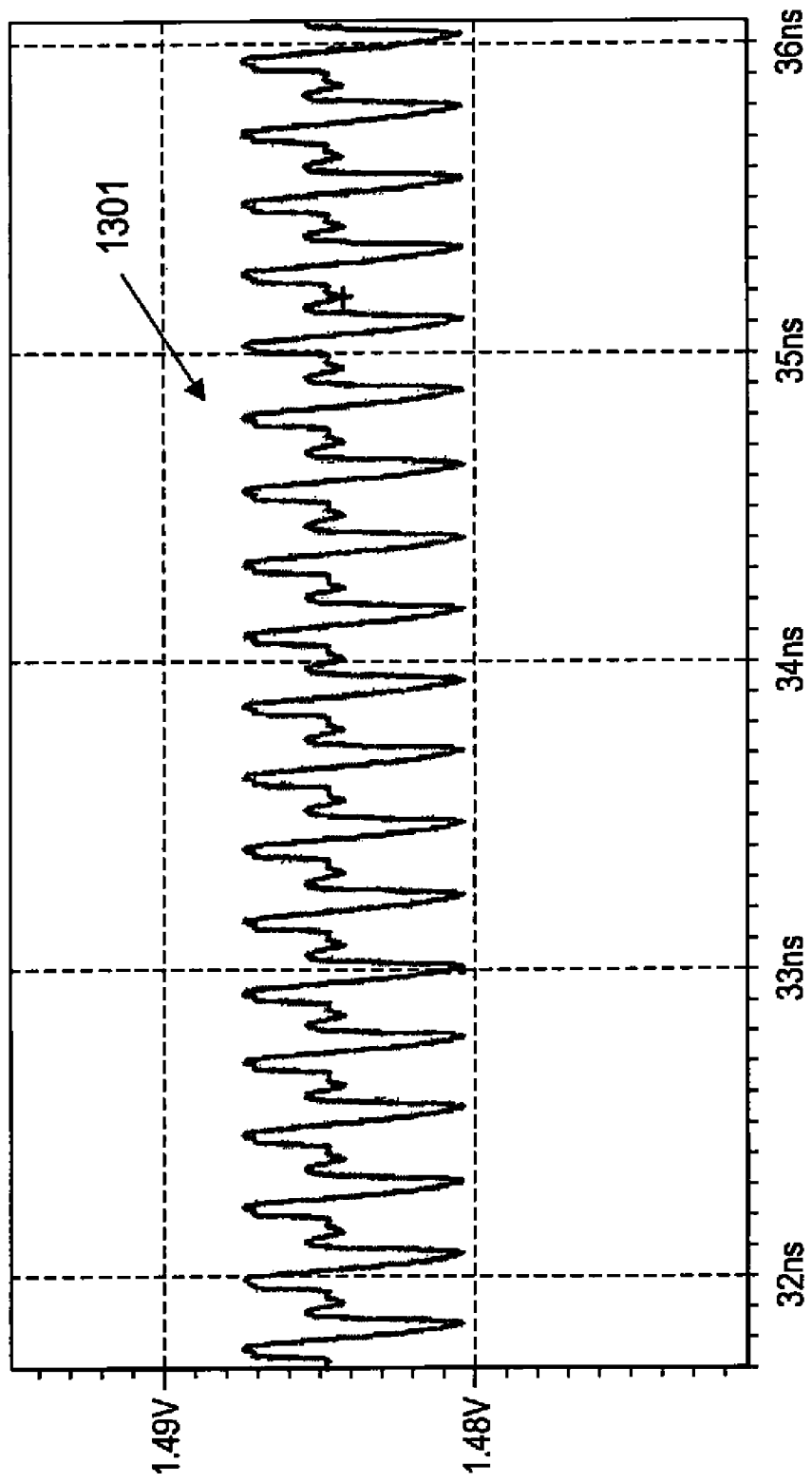
FIG. 13 is a waveform representing the AC ripple output of the voltage converter of FIG. 2.

FIG. 13 is a waveform 1301 representing an AC ripple that can be produced by voltage converter 110 described above. As shown in FIG. 13, the output ripple of waveform 1301 is very small (<0.01V). While not directly observable from FIG. 13 alone, the frequency of the AC ripple is orders of magnitude above that of conventional switching capacitor power supplies, which may make filtering power line noise easier using smaller components.

Figure 14:
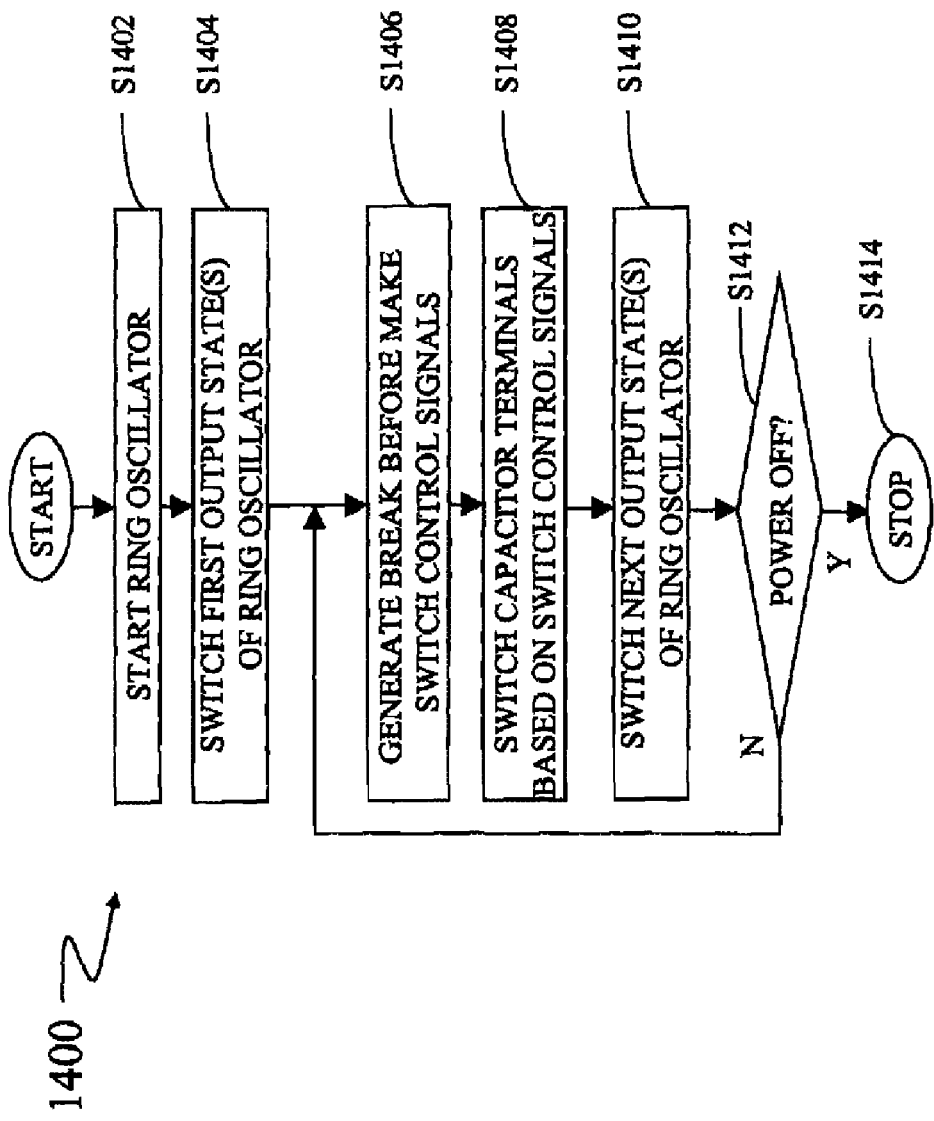
FIG. 14 is a flowchart outlining an exemplary process for operating an exemplary switching capacitor voltage converter.

FIG. 14 is a flowchart outlining an exemplary process for operating an exemplary switching capacitor voltage converter, such as the voltage converter 110 depicted in FIG. 1. The process starts in step S1402 where a ring oscillator circuit, such as the timing circuit 210 depicted in FIG. 3, is started. Next, in step S1404, a state of the ring oscillator circuit is switched to a first state. The process continues to step S1406.

In step S1406, a number of shaped switch control signals are generated using the "break before make" approach discussed above. Next, in step S1408, a first terminal of a respective capacitor is switched between an input/supply voltage line and an output voltage line while a second terminal, of the respective capacitor is switched between the output voltage line and a reference line, e.g., ground. Note that in various embodiments, the first and second capacitor terminals may be switched according to the "break before make" technique to avoid possible shorts. Then, in step S1410, the state of the ring oscillator circuit is switched to a next state. The process continues to step S1412.

In step S1412, a determination is made as to whether to turn the power of the voltage converter off. If power is to be turned off, the process continues to step S1414 where the process stops; otherwise, the process returns to step S1406 where a next set of "break before make" signals are generated for another capacitor.

While the disclosed methods and systems have been described in conjunction with exemplary embodiments, these embodiments should be viewed as illustrative, not limiting. Various modifications, substitutes, or the like are possible within the spirit and scope of the disclosed methods and systems.

What is claimed is:

1. A voltage converter having a supply voltage line, an output voltage line and a reference voltage line, comprising:
    a plurality of capacitors each having a first terminal and a second terminal, wherein each first terminal periodically switches between the supply voltage line and the output voltage line, and each second terminal periodically switches between the output voltage line and the reference voltage line;
    a first switching circuit configured to switch each first terminal between the supply voltage line and the output voltage line; and
    a second switching circuit configured to switch each second terminal between the output voltage line and the reference voltage line; and
    a signal shaping circuit coupled to the second switching circuit, the signal shaping circuit including a plurality of first buffers arranged in series, and a plurality of second buffers arranged in series.

2. The voltage converter of claim 1, wherein the voltage converter is a step-down voltage converter.

3. The voltage converter of claim 2, wherein a voltage difference between the output voltage line and the reference line is substantially half a voltage difference between the supply voltage line and the reference line.

4. The voltage converter of claim 1, further comprising a first means for switching each first terminal between the supply voltage line and the output voltage line, and a second means for switching each second terminal between the output voltage line and the reference voltage line.

5. The voltage converter of claim 1, wherein the first switching circuit includes two transistors, each transistor including a first power terminal, a second power terminal and a control terminal.

6. The voltage converter of claim 5, wherein the two transistors are each connected to a respective first capacitor terminal via the first power terminal.

7. The voltage converter of claim 6, wherein the two transistors are FETs.

8. The voltage converter of claim 7, wherein the two transistors are an n-channel FET and a p-channel FET.

9. The voltage converter of claim 8, wherein at least one power terminal of the p-channel FET is connected to the supply voltage line.

10. The voltage converter of claim 9, wherein at least one power terminal of the n-channel FET is connected to the output voltage line.

11. The voltage converter of claim 1, wherein the second switching circuit includes two transistors, each transistor including a first power terminal, a second power terminal and a control terminal.

12. The voltage converter of claim 11, wherein the two transistors are each connected to a respective second capacitor terminal via the first power terminal.

13. The voltage converter of claim 12, wherein at least one power terminal of a first transistor of the second switching circuit is connected to the output voltage line, and at least one power terminal of a second transistor of the second switching circuit is connected to the reference voltage line.

14. The voltage converter of claim 13, wherein the first transistor is a p-channel FET and the second transistor is an n-channel PET.

15. The voltage converter of claim 1, wherein the second switching circuit switches each second terminal between the output voltage line and the reference voltage line.

16. The voltage converter of claim 15, wherein the second switching circuit includes two transistors, each transistor including a first power terminal, a second power terminal and a control terminal;
   wherein for each second switching circuit, the two transistors are each connected to a respective second capacitor terminal via the first power terminal; and
   wherein at least one power terminal of a first transistor of each second switching circuit is connected to the output voltage line, and at least one power terminal of a second transistor of each second switching circuit is connected to the reference voltage line.

17. The voltage converter of claim 1, further comprising a signal shaping means coupled to the first switching circuit for causing the first switching circuit to break contact with one line before making contact with another.

18. The voltage converter of claim 17, further comprising a timing means for providing a series of capacitor switching timing signals for the signal shaping circuit.

19. The voltage converter of claim 1, further comprising the signal shaping circuit coupled to the second switching circuit for causing the second switching circuit to break contact with one line before making contact with another.

20. The voltage converter of claim 19, wherein the signal shaping circuit includes one or more buffers configured to produce two control output signals having rising edges delayed relative to one another.

21. The voltage converter of claim 19, wherein the signal shaping circuit includes one or more buffers configured to produce two control output signals having rising edges delayed relative to one another and falling edges delayed relative to one another.

22. The voltage converter of claim 19, wherein the signal shaping circuit includes one or more first buffers having n-channel FETs and p-channel FETs with the n-channel FETs being smaller than the p-channel FETs; and
   one or more second buffers having n-channel FETs and p-channel FETs with the p-channel FETs being smaller than the n-channel FETs.

23. The voltage converter of claim 19, further comprising a timing circuit configured to provide a series of capacitor switching timing signals to the signal shaping circuit.

24. The voltage converter of claim 23, wherein the timing circuit includes at least one ring oscillator.

25. The voltage converter of claim 24, wherein the timing circuit includes at least two synchronized ring oscillators operating at different voltage ranges.

26. A portable apparatus incorporating the voltage converter of claim 1.

27. An electronic apparatus incorporating the voltage converter of claim 1.

28. A step-down voltage converter having a supply voltage line, an output voltage line and a reference voltage line, comprising:
   a plurality of capacitors each having a first terminal and a second terminal, wherein each first terminal periodically switches between the supply voltage line and the output voltage line, and each second terminal periodically switches between the output voltage line and the reference voltage line, and wherein each first terminal and second terminal for a respective capacitor switches at substantially same times;
   a first switching circuit configured to switch each first terminal between the supply voltage line and the output voltage line, wherein each first switching circuit includes an n-channel FET and a p-channel FET;
   a second switching circuit configured to switch each second terminal between the output voltage line and the reference voltage line, wherein each second switching circuit includes an n-channel FET and a p-channel FET;
   a signal shaping circuit coupled to each of the first and second switching circuits for causing the first and second switching circuits to break contact with one line before making contact with another, wherein the signal shaping circuit includes a plurality of first buffers arranged in series and a plurality of second buffers arranged in series, and wherein the first buffers include n-channel FETs and p-channel FETs with the n-channel FETs being smaller than the p-channel FETs, and the second buffers include n-channel FETs and p-channel FETs with the p-channel FETs being smaller than the n-channel FETs; and
   a timing circuit configured to provide a series of capacitor switching timing signals to the signal shaping circuit, the timing circuit including two synchronized ring oscillators operating at different voltage ranges.

29. A voltage converter having a supply voltage line, an output voltage line and a reference voltage line, comprising:
   a plurality of capacitors;
   first switching means for periodically switching at least one terminal of the capacitors between the supply voltage line and the output voltage line;
   second switching means for periodically switching a second terminal of each capacitor between the output voltage line and the reference voltage line; and
   a signal shaping means coupled to the second switching means, the signal shaping means including a plurality of first buffers arranged in series, and a plurality of second buffers arranged in series.

30. The voltage converter of claim 29, further comprising a timing means for providing a series of switching timing signals for the plurality of capacitors such that the capacitors switch between lines at regular intervals.

31. A method for providing a stepped-down voltage to an output voltage line using a supply voltage line and a reference voltage line, the method comprising:
   periodically switching a first terminal of a plurality of capacitors between the supply voltage line and the output voltage line;
   periodically switching by a switching circuit a second terminal of each of the plurality of capacitors between the output voltage line and the reference voltage line; and
   coupling the switching circuit with a signal shaping circuit including a plurality of first buffers arranged in series, and a plurality of second buffers arranged in series.

32. The method of claim 31, wherein switching of at least one of the first terminals is done on a break before make basis.

33. The method of claim 31, wherein switching of each of the first and second terminals is done on a break before make basis.

34. The method of claim 31, further comprising generating one or more sets of staggered timing signals to control the switching of each of the first and second terminals such that each capacitor is switched between lines at substantially equal intervals relative to one another.

35. The method of claim 34, further comprising shaping the one or more sets of staggered timing signals to control the switching of each of the first and second terminals such that each capacitor is switched between lines on a break before make basis.

36. A method for forming a voltage converter, comprising:
provviding a supply voltage line, an output voltage line and a reference voltage line;
providing a plurality of capacitors each having first and second terminals;
connecting each of the first terminals to a first switch circuit capable of switching the respective first terminal to either the supply voltage line and the output voltage line;
connecting each of the second terminals to a second switch circuit capable of switching the respective second terminal to either the output voltage line and the reference voltage line; and
coupling the second switch circuit with a shaping circuit including a plurality of first buffers arranged in series, and a plurality of second buffers arranged in series.

37. The method of claim 36, further comprising coupling a timing circuit to the shaping circuit, the timing circuit capable of generating one or more sets of staggered timing signals such that each capacitor is switched between lines at substantially equal intervals from one another.

* * * * *